(12) United States Patent
Fukawatase et al.

(10) Patent No.: US 7,559,573 B2
(45) Date of Patent: Jul. 14, 2009

(54) VEHICLE SIDE AIRBAG APPARATUS

(75) Inventors: Osamu Fukawatase, Aichi-ken (JP); Makoto Sekizuka, Toyota (JP); Yasushi Ito, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 11/976,692

(22) Filed: Oct. 26, 2007

(65) Prior Publication Data
US 2008/0100045 A1    May 1, 2008

(30) Foreign Application Priority Data
Oct. 30, 2006   (JP) .............. 2006-294511

(51) Int. Cl.
*B60R 21/207* (2006.01)
(52) U.S. Cl. ................. 280/730.2; 280/743.2
(58) Field of Classification Search .......... 280/728.1, 280/730.1, 730.2, 743.2
See application file for complete search history.

(56) References Cited

U.S. PATENT DOCUMENTS

| 5,647,609 | A |   | 7/1997 | Spencer et al. | |
| 5,829,779 | A | * | 11/1998 | Nakashima et al. | 280/730.2 |
| 6,062,594 | A | * | 5/2000 | Asano et al. | 280/730.2 |
| 6,065,772 | A | * | 5/2000 | Yamamoto et al. | 280/730.2 |
| 6,213,500 | B1 | * | 4/2001 | Jost et al. | 280/730.2 |
| 6,270,113 | B1 |   | 8/2001 | Pongdet | |
| 6,364,348 | B1 |   | 4/2002 | Jang et al. | |
| 6,478,329 | B1 | * | 11/2002 | Yokoyama | 280/729 |

FOREIGN PATENT DOCUMENTS

| GB | 2 299 061 | 9/1996 |
| JP | 5-238347 | 9/1993 |
| JP | 9-39710 | 2/1997 |
| JP | 10-138860 | 5/1998 |

(Continued)

OTHER PUBLICATIONS

Japanese Office Action dated Aug. 26, 2008.

(Continued)

*Primary Examiner*—John Q. Nguyen
*Assistant Examiner*—Robert A. Coker
(74) *Attorney, Agent, or Firm*—Finnegan, Henderson, Farabow, Garrett & Dunner, LLP

(57) ABSTRACT

A side airbag has a lower chamber corresponding to the chest of the occupant and an upper chamber corresponding to the head of the occupant. A strap is provided at the boundary between the lower and upper chambers. The attachment position of a door-side attachment portion of the strap is higher than the attachment position of a seat-side attachment portion of the strap and lower than the upper end of a door trim or at the same height as the upper end of the door trim. Thus, the peripheral length from the upper end of a door-side base cloth of the side airbag to the door-side attachment portion of the strap is shorter than the peripheral length from the upper end of a seat-side base cloth of the side airbag to the seat-side attachment portion of the strap. As such, upon deployment of the side airbag, the upper chamber can be raised up toward a door window glass.

13 Claims, 6 Drawing Sheets

FOREIGN PATENT DOCUMENTS

| | | |
|---|---|---|
| JP | 11-278195 | 10/1999 |
| JP | 2000-108835 | 4/2000 |
| JP | 2003-501303 | 1/2003 |
| JP | 2003-182499 | 7/2003 |
| JP | 2004-243887 | 9/2004 |
| JP | 2007-320455 | 12/2007 |
| WO | WO 97/01461 | 1/1997 |
| WO | WO 97/06987 | 2/1997 |

OTHER PUBLICATIONS

Japanese Office Action dated May 12, 2009, including English language translation (5 pages).

* cited by examiner

# VEHICLE SIDE AIRBAG APPARATUS

INCORPORATION BY REFERENCE

The disclosure of Japanese Patent Application No. 2006-294511 filed on Oct. 30, 2006 including the specification, drawings and abstract is incorporated herein by reference in its entirety.

BACKGROUND OF THE INVENTION

1. Field of the Invention

The invention relates to a vehicle side airbag apparatus for protecting the head and chest of an occupant.

2. Description of the Related Art

In recent years, side airbags have been proposed which are long in the vertical direction and large in size to realize an extended occupant protection area that also covers the head of the occupant as well as the chest (Refer to Japanese Patent No. 3467473).

Japanese Patent No. 3467473 describes a side airbag that is manufactured by sewing a vehicle-outer-side base cloth and a vehicle-inner-side base cloth together into the shape of a bag. In this side airbag, a tether (partitioning cloth) in which a plurality of communication holes are formed is sewn to the middle portion of the side airbag in the vertical direction thereof, whereby the side airbag is divided into a lower chamber located below the tether and used to protect the chest of the occupant and an upper chamber located above the tether and used to protect the head of the occupant.

However, this side airbag still has a room for improvement as follows.

That is, when a side airbag that is long in the vertical direction and large in size as the one described in Japanese Patent No. 3467473 is deployed upon a side collision of the vehicle, the side airbag is deployed upward to the area above the door trim. At this time, however, because a typical door trim has a concave portion above an armrest, the side airbag is deployed along the outline of the concave portion. Therefore, when the side airbag is being deployed toward the area above the door trim, the deployment direction of the upper chamber of the side airbag tends to be biased to the inner side of the vehicle in the lateral direction thereof. Therefore, it is difficult to deploy a side airbag of this kind to between the head of the occupant and the door window glass.

SUMMARY OF THE INVENTION

The invention provides a vehicle side airbag apparatus that can deploy a head-protection chamber of a side airbag in a substantially vertical direction to between the head of the occupant and the door window glass.

An aspect of the invention relates to a vehicle side airbag apparatus, having: a gas generator that generates gas; a side airbag that is provided in a folded or rolled state in a side portion of a seatback of a seat of a vehicle, which is closer to a door of the vehicle, and has a lower chamber corresponding to the chest of an occupant and an upper chamber corresponding to the head of the occupant, the side airbag being deployed by the gas supplied from the gas generator; and a deployment direction restrictor that raises the upper chamber up toward the door of the vehicle with respect to the lower chamber during deployment of the side airbag, the deployment direction restrictor being installed in the side airbag such that the attachment position of the deployment direction restrictor on a door-side base cloth of the side airbag is located higher than the attachment position of the deployment direction restrictor on a seat-side base cloth of the side airbag.

According to the above structure, when the gas generator is activated to generate gas, the generated gas is supplied into the side airbag provided in a folded or rolled state, whereby the side airbag is deployed to between the occupant and the door of the vehicle. More specifically, the lower chamber of the side airbag is deployed to between the chest of the occupant and the door of the vehicle and the upper chamber of the side airbag is deployed to between the head of the occupant and the door of the vehicle.

When such a vertically long side airbag having an upper chamber is deployed, it is deployed along the outline of the passenger compartment side surface of the door of the vehicle from the lower side to the upper side. However, typically, a concave portion that is dent toward the outer side of the vehicle in the lateral direction of the vehicle is formed in the passenger compartment-side surface of the door, and it is therefore likely that, upon deployment of the side airbag, the lower outer portion of the lower chamber fits in the concave portion and the upper chamber is deployed obliquely upward to the inner side due to the reaction force exerted from the concave portion.

According to the invention, however, because the deployment direction restrictor is installed in the side airbag such that the attachment position of the deployment direction restrictor on the door-side base cloth of the side airbag is located higher than the attachment position of the deployment direction restrictor on the seat-side base cloth of the side airbag, the deployment direction restrictor is tensioned between the door-side base cloth and the seat-side base cloth such that the deployment direction restrictor is slanted (e.g., slanted down to the right when viewed from the front side of the vehicle if the vehicle is a right-hand drive car) when the side airbag is in a deployed state. As such, the upper chamber is raised up toward the door of the vehicle with respect to the lower chamber fitting in the concave portion. Thus, the upper chamber can be deployed to between the door of the vehicle and the head of the occupant in a substantially vertical direction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3A is a plan view showing the developed planer shape of the side airbag shown in FIG. 2A before sewing, and FIG. 3B is a plan view showing the side airbag formed by sewing;

FIG. 4A is a front view showing the initial stage of the deployment and corresponding to FIG. 1, FIG. 4B is a front view showing an intermediate stage of the deployment and corresponding to FIG. 1, and FIG. 4C is a view showing the state where the deployment of the side airbag has been completed and corresponding to FIG. 1;

FIG. 5A is a side view showing the activated state of the vehicle side airbag apparatus and corresponding to FIG. 2A and FIG. 5B is an enlarged perspective view showing the strap and corresponding to FIG. 2B; FIG. 6A is a plan view showing the deployed planar shape of the side airbag and corresponding to FIG. 3A before sewing, and FIG. 6B is a plain view showing the side airbag formed by sewing.

DETAILED DESCRIPTION OF THE EMBODIMENTS

First Example Embodiment

Hereinafter, a vehicle side airbag apparatus according to the first example embodiment of the invention will be described with reference to FIG. 1 to FIG. 4C. In these drawings, the arrow FR points the front side of the vehicle, the arrow UP points the upper side of the vehicle, and the arrow IN points the inner side of the vehicle in the lateral direction thereof.

Figure 1:
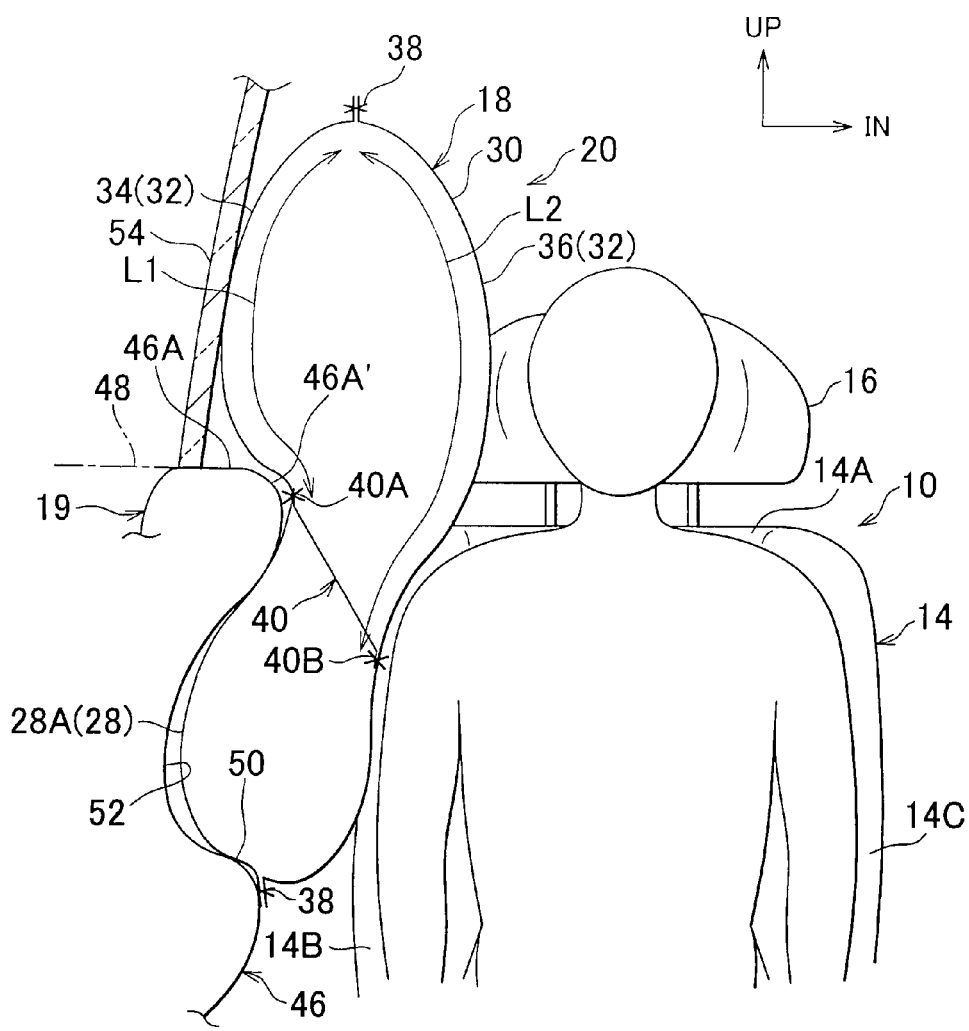
FIG. 1 is a front view showing a state where the side airbag of the vehicle side airbag apparatus of the first example embodiment is in a deployed state after activation.
Figure 2A:
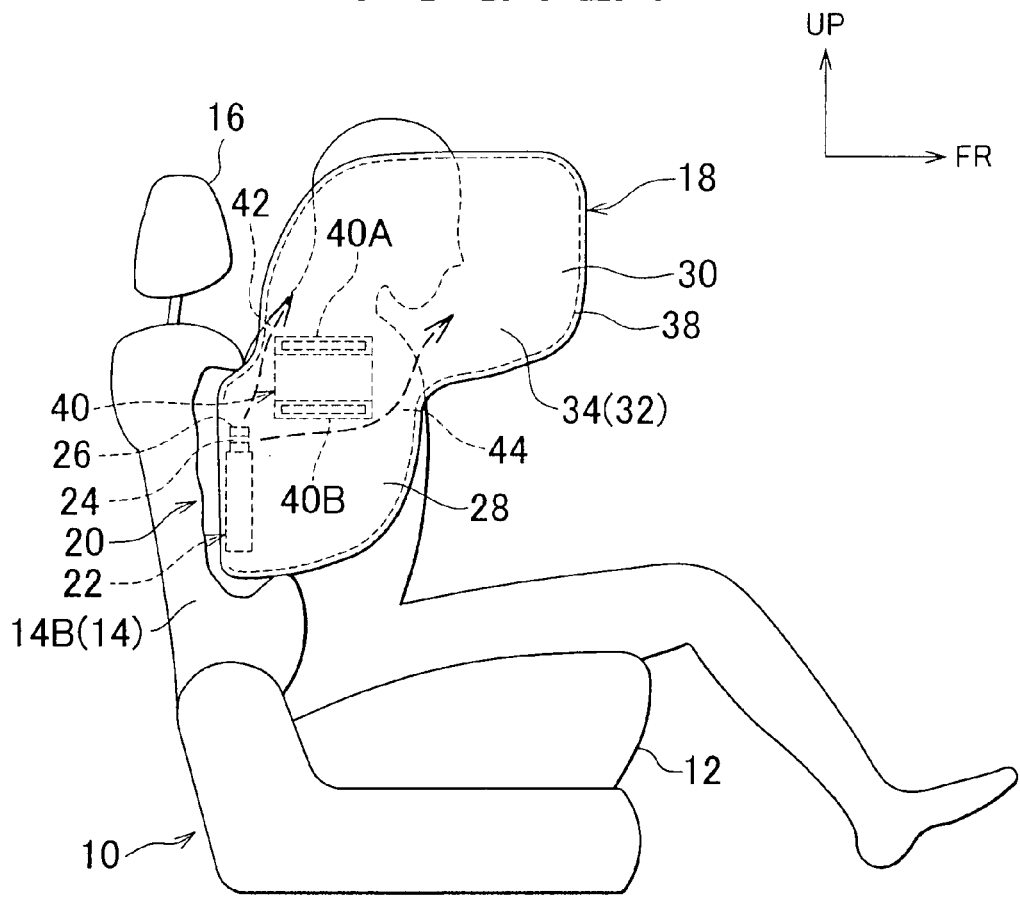
FIG. 2A is a side view showing the deployed state of the side airbag of the vehicle side airbag apparatus shown in FIG. 1.
Figure 2B:
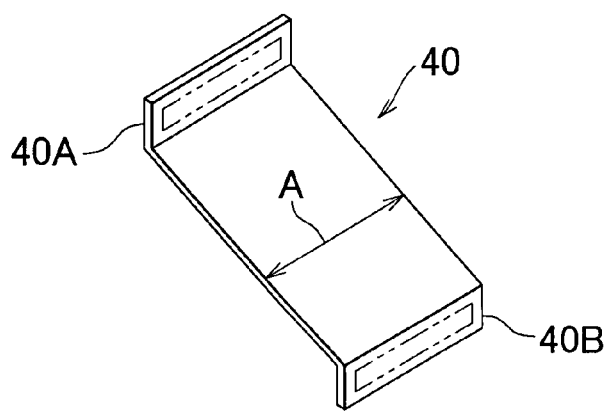
FIG. 2B is an enlarged perspective view of the strap shown in FIG. 2A.
Figure 3A:
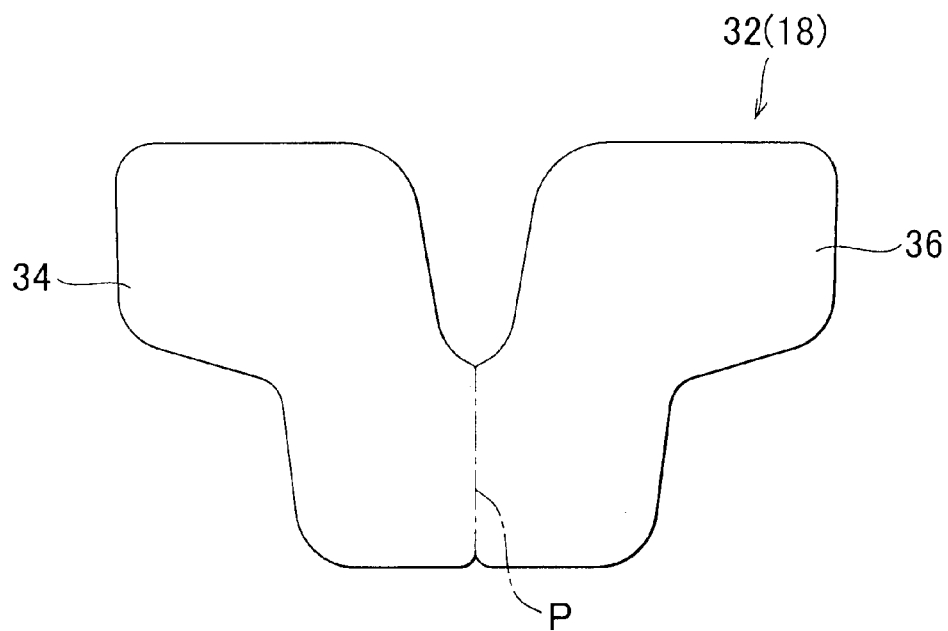
FIG. 3A and FIG. 3B show an example of the manufacturing method of the side airbag of the first example embodiment, where
Figure 3B:
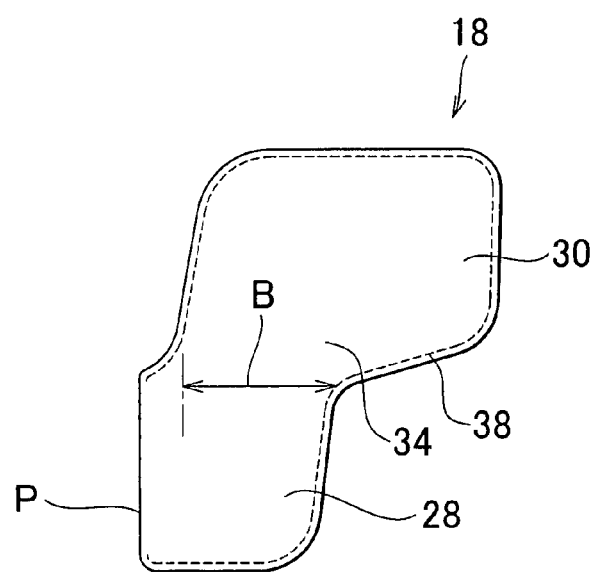

FIG. 1 is a front view showing a state where the side airbag of the vehicle side airbag apparatus of the first example embodiment is in a deployed state after activation. FIG. 2A is a side view showing the same deployed state of the side airbag of the vehicle side airbag apparatus of the first example embodiment. FIG. 2B is a perspective view showing a strap constituting the main portion of the vehicle side airbag apparatus of the first example embodiment. FIG. 3A and FIG. 3B illustrate a side airbag manufacturing procedure.

Referring to FIG. 1 and FIG. 2A, a vehicle seat 10 has a seat cushion 12 on which the occupant is seated, a seatback 14 that is tiltably supported at the rear end of the seat cushion 12 to support the back of the occupant, and a headrest 16 that is provided on the seatback 14 to support the head of the occupant and is movable up and down. The seatback 14 has a center portion 14A that is provided at the lateral center of the seat and directly Supports the back of the occupant, a side portion 14B that is closer to the door of the vehicle, and that is integrally formed along the edge of the center portion 14A on the outer side of the vehicle in the lateral direction of the vehicle, and a side portion 14C that is closer to a tunnel (inner side), and that is integrally formed along the edge of the center portion 14A on the inner side of the vehicle in the lateral direction of the vehicle. The side portion 14B and the side portion 14C are formed in a shape protruding toward the front side of the vehicle.

A vehicle side airbag apparatus 20 is embedded in the vertical middle portion of the side portion 14B. The vehicle side airbag apparatus 20 deploys a side airbag 18 forward (i.e., to the front side of the vehicle) and upward from the seat along the passenger compartment side surface of a side door 19.

As shown in FIG. 2A, the vehicle side airbag apparatus 20 is constituted of an inflator 22 and a side airbag 18. The inflator 22 is a generally cylindrical gas generation device that is activated to generate gas upon a side collision of the vehicle. The side airbag 18 is embedded in a folded or rolled state in the side portion 14B and is deployed toward the front side of the vehicle. The inflator 22 is arranged upright in the side portion 14B such that its lengthwise direction coincides with the up-down direction of the seat. An inflation gas outlet portion 26 having an inflation gas outlet 24 is provided at the upper end of the inflator 22. Further, the vehicle side airbag apparatus 20 of the first example embodiment has a case for accommodating the inflator 22 and the side airbag 18. The case is secured to one side of the seatback frame constituting the skeletal structure of the seatback 14. Note that a caseless type side airbag apparatus having no such a case may alternatively be used.

As shown FIG. 2A and FIG. 3B, the side airbag 18 is formed such that it looks like the letter "Z" when viewed from the side of the vehicle, having a lower chamber 28 corresponding to the chest of the occupant and an upper chamber 30 provided above the lower chamber 28 corresponding to the head of the occupant. The following briefly explains how a side airbag that looks like the letter "Z" when viewed in the lateral direction of the vehicle is manufactured. First, referring to FIG. 3A, an airbag base cloth 32 is cut into a symmetrical V-like shape. The half of the airbag base cloth 32 on the left side of FIG. 3A is deployed on the door side upon deployment of the side airbag 18 and it will therefore be referred to as "door-side base cloth 34". On the other hand, the half of the airbag base cloth 32 on the right side of FIG. 3B is deployed on the seat side upon deployment of the side airbag 18 and it will therefore be referred to as "seat-side base cloth 36". The airbag base cloth 32 is folded along the broken line P at the lateral center of the airbag base cloth 32 and thus formed into a generally "Z" shape as shown in FIG. 3B. Then, the outer peripheries of the door-side base cloth 34 and the seat-side base cloth 36 except the side of the broken line P are sewn together, whereby an outer seam portion 38 is formed. This is how the side airbag 18 is manufactured. In the first example embodiment, because a strap 40 is provided as will be described later, attachment portions 40A, 40B of the strap 40 are sewn to the door-side base cloth 34 and the seat-side base cloth 36, respectively, before sewing the outer peripheries of the door-side base cloth 34 and the seat-side base cloth 36 together. When preparing the airbag base cloth 32 defining the developed planar shape of the side airbag 18 by cloth cutting, an opening into which the gas of the inflator 22 is discharged is formed at the airbag base cloth 32.

The strap 40 is provided near the boundary between the lower chamber 28 and the upper chamber 30. The strap 40 is a rectangular fabric member that serves to restrict the deployment direction of the side airbag 18. The strap 40 is rectangular as viewed from above, having no opening. The length A of the strap 40 in the longitudinal direction of the vehicle (Refer to FIG. 2B) is shorter than the length B of the boundary between the lower chamber 28 and the upper chamber 30 in the longitudinal direction of the vehicle (Refer to FIG. 3B). Thus, a rear gas passage 42 and a front gas passage 44 are formed on the front and rear sides of the strap 40, respectively, upon deployment of the side airbag 18. Meanwhile, because the side airbag 18 is formed such that it looks like the letter "Z" in its side view, that is, because the upper chamber 30 protrudes to the front side of the vehicle more than the lower chamber 28 does, the cross-dimensional area of the front gas passage 44 is set larger than that of the rear gas passage 42 accordingly.

The strap 40 is sewn to the door-side base cloth 34 and to the seat-side base cloth 36 such that, in the deployed state of the side airbag 18, the attachment portion 40A of the strap 40 that is attached to the door-side base cloth 34 (Refer to FIG. 1) is located higher than the attachment portion 40B of the strap 40 that is attached to the seat-side base cloth 36.

More specifically, the attachment position of the attachment portion 40A on the door-side base cloth 34 is set such that the attachment portion 40A, in the deployed state of the side airbag 18, is located slightly lower than an inner edge portion 46A' of an upper end portion 46A of a door trim 46, which is a resin made part attached on the passenger compartment side of the side door 19 and having a decorated surface. That is, the position of the upper end portion 46A of the door trim 46 in the up-down direction of the side door 19 substantially coincides with a beltline 48 of the side door 19, and the attachment position of the attachment portion 40A on the door-side base cloth 34 is set lower than the position of the upper end portion 46A of the door trim 46. On the other hand, the attachment portion 40B of the strap 40 is sewn to a position on the seat-side base cloth 36 that is lower than the attachment position of the attachment portion 40A of the strap 40 on the door-side base cloth 34. As such, if the vehicle is a right-hand drive car, the strap 40 is tensioned between the seat-side base cloth 36 and the door-side base cloth 34 near the center of the side airbag 18 in the up-down direction thereof such that the strap 40 is slanted down to the right when the deployed side airbag 18 is viewed from the front side of the vehicle. Thus, according to the side airbag 18 of the first example embodiment, as shown in FIG. 1, when the side airbag 18 is in the deployed state, the peripheral length L1 from the attachment position of the attachment portion 40A on the door-side base cloth 34 to the outer seam portion 38 at the upper end of the side airbag 18 is shorter than the peripheral length L2 from the attachment position of the attachment portion 40B on the seat-side base cloth 34 to the outer seam portion 38.

Next, the effects and advantages of the first example embodiment will be described.

When a side collision occurs, the side collision is detected by an airbag sensor (not shown in the drawing), and the detection signal is input from the air bag sensor to an airbag ECU. The airbag ECU then determines, based on the detection signal, whether the vehicle side airbag apparatus 20 needs to be activated. If it is determined that the vehicle side airbag apparatus 20 needs to be activated, predetermined electric current is supplied to the inflator 22, so that the inflator 22 is activated to generate gas. The generated gas is discharged from the inflation gas outlet 24 of the inflation gas outlet portion 26, whereby the side airbag 18 embedded in a folded or rolled state in the side portion 14B of the seatback 14 is deployed to between the occupant and the side door 19. At this time, more specifically, the lower chamber 28 that is close to the inflation gas outlet portion 26 of the inflator 22 is first deployed to between the chest of the occupant and the side door 19, and then the gas in the lower chamber 28 is supplied to the upper chamber 30 via the rear gas passage 42 and the front gas passage 44, whereby the upper chamber 30 is deployed to between the head of the occupant and the side door 19.

Figure 4A:
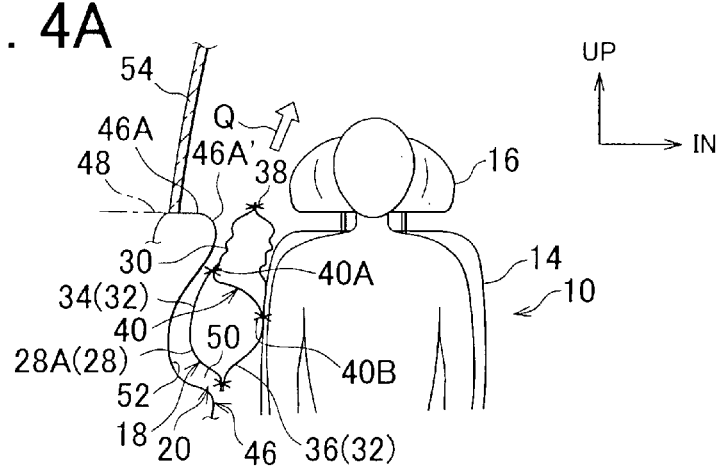
FIG. 4A to FIG. 4C are views illustrating how the side airbag of the vehicle side airbag is deployed, where
Figure 4B:
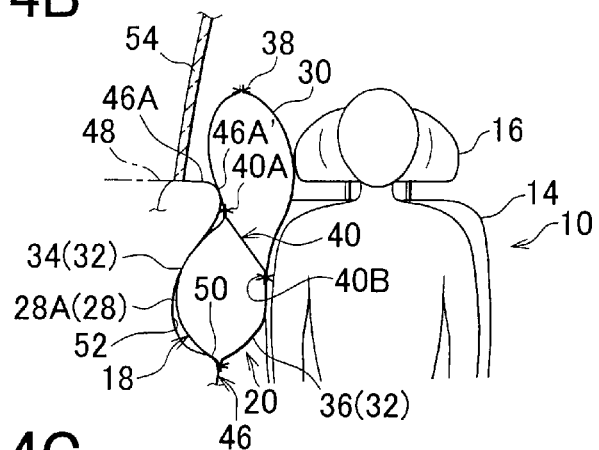
Figure 4C:
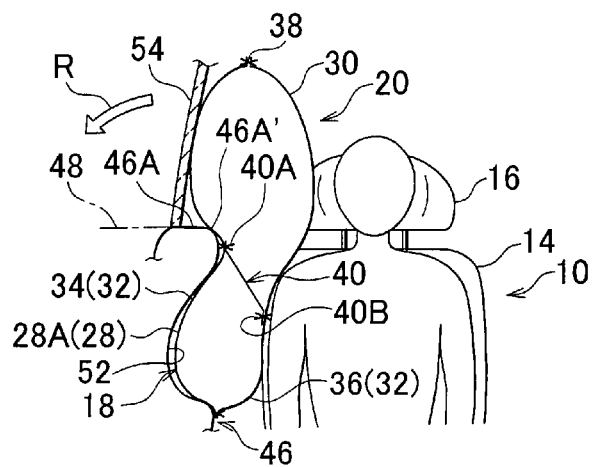

Meanwhile, having the upper chamber 30 formed above the lower chamber 28 to protect the head of the occupant, the side airbag 18 of the first example embodiment is long in the vertical direction and thus large in size, and further a concave portion 52 that is dent toward the outer side of the vehicle in the lateral direction thereof is present above an armrest 5. Therefore, when the side airbag 18 is being deployed along the outline of the door trim 46 constituting the inner panel of the side door 19 from the lower side to the upper side, it is likely that a lower outer portion 28A of the lower chamber 28 fits in the concave portion 52 and the upper chamber 30 is deployed obliquely upward to the inner side (in the direction indicated by the arrow Q in FIG. 4A) due to the reaction force exerted from the concave portion 52, as shown in FIG. 4A to FIG. 4C.

However, according to the first example embodiment, as described above, the strap 40 is provided in the side airbag 18 and its attachment to the side airbag 18 is arranged such that the attachment position of the attachment portion 40A on the door-side base cloth 34 is located higher than the attachment position of the attachment portion 40B on the seat-side base cloth 36. Thus, when the side airbag 18 is in the deployed state, the strap 40 is tensioned between the door-side base cloth 34 and the seat-side base cloth 36 such that the strap 40 is slanted down to the right when viewed from the front side of the vehicle. Therefore, upon deployment of the side airbag 18, the upper chamber 30 of the side airbag 18 is pulled toward a door window glass 54 (in the direction indicated by the arrow R in FIG. 4C).

More specifically, in the first example embodiment, as mentioned above, the attachment position of the attachment portion 40A on the door-side base cloth 34 of the side airbag 18 is set higher than the attachment position of the attachment portion 40B on the seat-side base cloth 36 of the side airbag 18. Therefore, the peripheral length L1 from the attachment position of the attachment portion 40A on the door-side base cloth 34 to the outer seam portion 38 at the upper end of the side airbag 18 is shorter than the peripheral length L2 from the attachment position of the attachment portion 40B on the seat-side base cloth 36 to the outer seam portion 38. Thus, upon deployment of the side airbag 18, the upper chamber 30 of the side airbag 18 is pulled toward the side of the shorter peripheral length L1 (the force acting toward the outside of the vehicle in the lateral direction of the vehicle is exerted to the upper chamber 30). As such, the upper chamber 30 is raised up toward the side door 19 with respect to the lower chamber 28 fitting in the concave portion 52. Thus, the upper chamber 30 can be deployed to between the side door 19 and the head of the occupant in a direction substantially perpendicular to the lateral direction of the vehicle.

As such, by setting the peripheral lengths L1, L2, which are measured from the attachment points of the strap 40, such that the peripheral length L1 is clearly shorter than the peripheral length L2 (L1<L2), the upper chamber 30, during deployment of the side airbag 18, can be raised up toward the side door 19, and therefore the upper chamber 30 can be deployed to between the side door 19 and the head of the occupant in a direction substantially perpendicular to the lateral direction of the vehicle. As a result, the performance for protecting the head of the occupant improves accordingly.

Further, in the first example embodiment, when the side airbag 18 is in the deployed state, the attachment position of the attachment portion 40A of the strap 40 on the door-side base cloth 34 is set lower than the upper end portion 46A of the door trim 46 attached on the inner side of the side door 19. Therefore, in an intermediate stage of the deployment of the side airbag 18 just before the deployment is completed (the deployment stage shown in FIG. 4B), the upper chamber 30 is pulled toward the side door 19 with respect to the lower chamber 28. That is, even if the attachment position of the attachment portion 40A of the strap 40 on the door-side base cloth 34 is slightly higher than the upper end portion 46A of the door trim 46, it is considered that a certain degree of effect for correcting the deployment direction of the upper chamber 30 can be obtained. However, by setting the attachment position of the attachment portion 40A of the strap 40 on the door-side base cloth 34 to a position at the same height as or lower than the upper end portion 46A of the door trim 46, it is possible to obtain a sufficient reaction force against the pulling force that is exerted on the door-side base cloth 34 when the upper chamber 30 is being raised up toward the side door 19 with respect to the lower chamber 28. According to the first example embodiment, as such, the upper chamber 30 of the side airbag 18 can be deployed to between the head of the occupant and the door window glass 54 of the side door 19 in a direction substantially perpendicular to the lateral direction of the vehicle.

MODIFICATION EXAMPLES OF THE FIRST EXAMPLE EMBODIMENT

Hereinafter, modification examples of the vehicle side airbag apparatus 20 of the first example embodiment will be described with reference to FIG. 5 and FIG. 6. Note that the elements and components that are the same as those in the first example embodiment are denoted by the same reference numerals and their descriptions will be omitted.

Figure 5A:
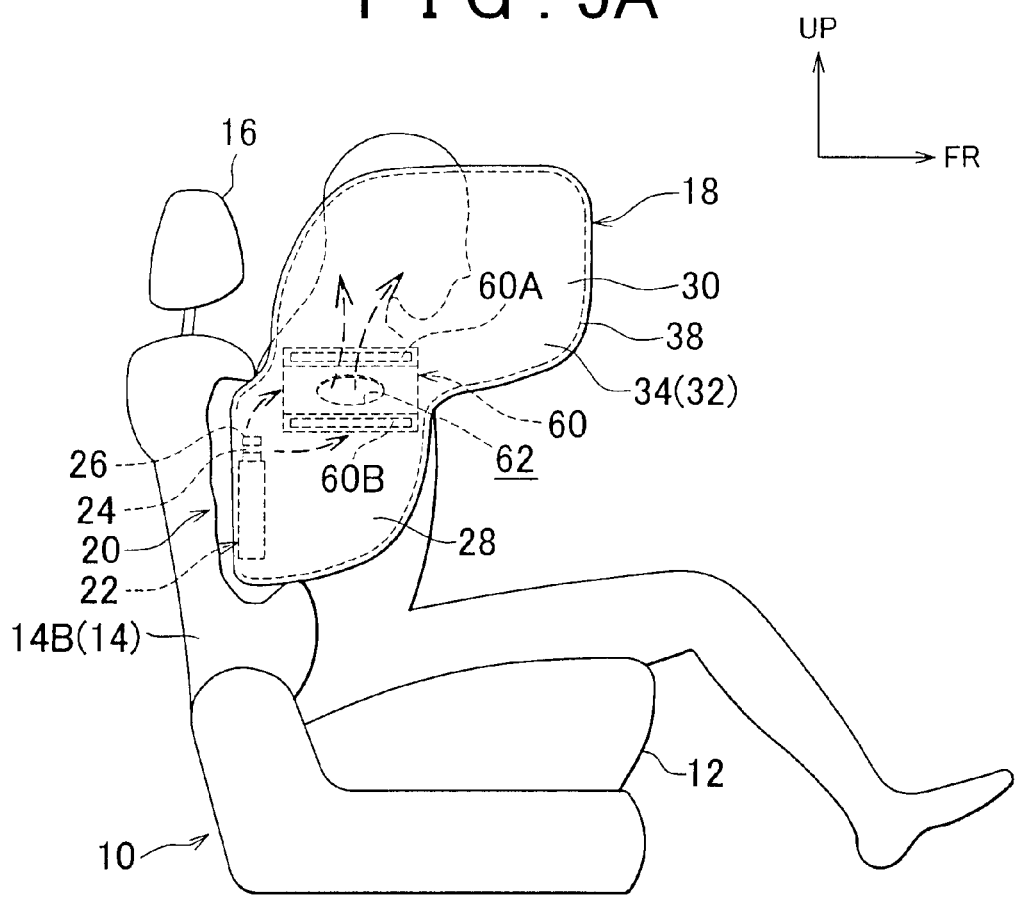
FIG. 5A and FIG. 5B are views showing a modification example of the strap of the first example embodiment, where
Figure 5B:
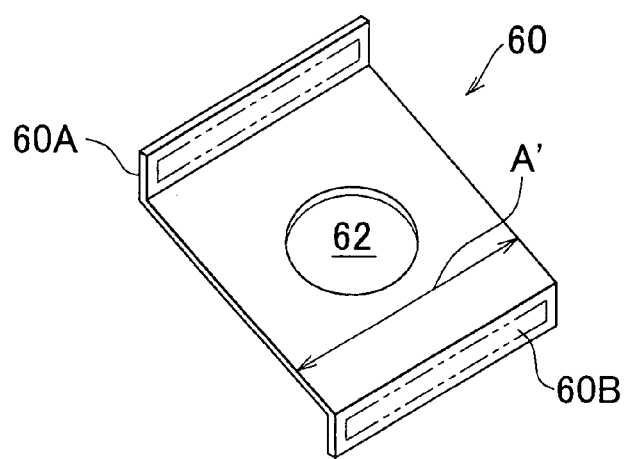

(1) In the modification example shown in FIG. 5, the length A' of a strap 60, which serves as a deployment direction restrictor, in the longitudinal direction of the vehicle is substantially equal to the length B of the boundary between the lower chamber 28 and the upper chamber 30 in the longitudinal direction of the vehicle (Refer to FIG. 3B), and therefore the rear gas passage 42 and the front gas passage 44 described in the first example embodiment are not provided. Alternatively, in this modification example, a circular through hole 62 is formed at the center of the strap 60, which serves as a gas passage from the lower chamber 28 to the upper chamber 30. Other structures (especially, the positional relation between the attachment positions of the attachment portions of the strap) are the same as those in the first example embodiment.

According to the above structure, the gas supplied to the lower chamber 28 enters the upper chamber 30 through the through hole 62 of the strap 60, whereby the upper chamber 30 is deployed. Because this modified structure also incorporates the key structures of the first example embodiment, the same effects and advantages as those in the first example embodiment can be obtained.

Figure 6A:
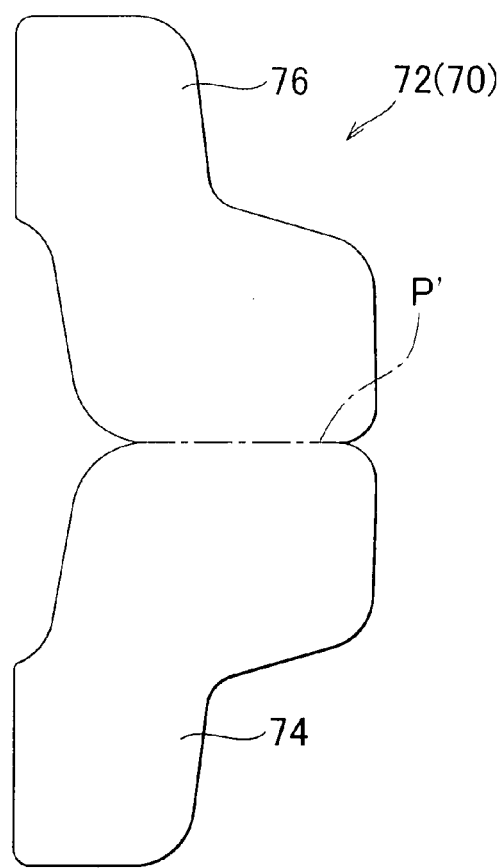
FIG. 6A and FIG. 6B show a modification example of the manufacturing method of the side airbag of the first example embodiment, where
Figure 6B:
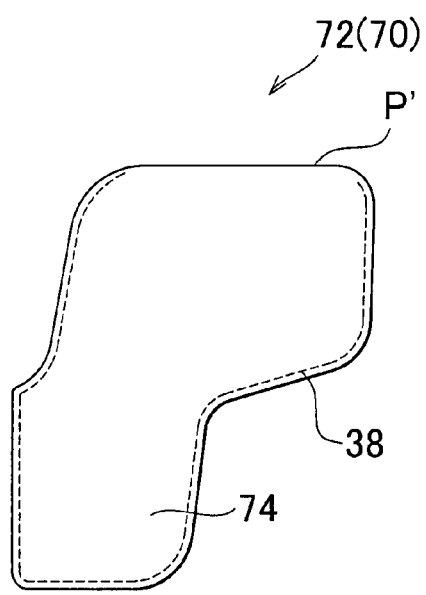

(2) According to the example embodiment shown in FIG. 6A, an airbag base cloth 72 defining the developed planar shape of a side airbag 70 is formed in a shape like the curly bracket or brace "}", and the airbag base cloth 72 is folded in the up-down direction along the broken line P' so that a door-side base cloth 74 and a seat-side base cloth 76 are overlapped. In this case, although the outer seam portion 38 is not formed at the upper edge of the side airbag 70, the peripheral lengths L1, L2 are measured from the broken line P' as they are measured from the seam portion 38 in the first example embodiment (Refer to FIG. 1). That is, the side airbag 70 is only different from the side airbag 18 in the developed planar shape of the side airbag, the folding direction of the side airbag, and the position of the outer seam portion 38 (Refer to FIG. 6B), and therefore the same advantages and effects as those in the first example embodiment can be obtained.

While the strap 60 that is rectangular as viewed from above is used as the deployment direction restrictor in the foregoing example structures, the invention is not limited to this. For example, a plurality of band-shaped straps may alternatively be used. Further, while the strap 60 is sewn to the side airbag 18 in the foregoing example structures, the strap 60 may alternatively be adhered to the side airbag 18.

What is claimed is:

1. A vehicle side airbag apparatus, comprising:
   a vehicle door having a window glass and a door trim attached on an inner side of the vehicle below the window glass;
   a gas generator that generates gas;
   a side airbag that is provided in a folded or rolled state in a side portion of a seatback of the seat, which is closer to the door, and has a lower chamber corresponding to a chest of an occupant and an upper chamber corresponding to a head of the occupant, the side airbag being deployed by the gas supplied from the gas generator; and
   a deployment direction restrictor that restricts expansion of the upper chamber so that the upper chamber expands toward the door with respect to the lower chamber during deployment of the side airbag, the deployment direction restrictor being installed in the side airbag such that a first attachment position of the deployment direction restrictor on a door-side base cloth of the side airbag is located higher than a second attachment position of the deployment direction restrictor on a seat-side base cloth of the side airbag;
   wherein when the side airbag is in a deployed state, the attachment position of the deployment direction restrictor on the door-side base cloth is lower than an upper end of the door trim, or at a same height as the upper end of the door trim.

2. The vehicle side airbag apparatus according to claim 1, wherein when the side airbag is in a deployed state, a first peripheral length from the attachment position of the deployment direction restrictor on the door-side base cloth to the upper end of the side airbag is shorter than a second peripheral length from the attachment position of the deployment direction restrictor on the seat-side base cloth to the upper end of the side airbag.

3. The vehicle side airbag apparatus according to claim 1, wherein the upper chamber protrudes toward the front side of the vehicle more than the lower chamber does.

4. The vehicle side airbag apparatus according to claim 1, wherein:
   a first length of the deployment direction restrictor in a longitudinal direction of the vehicle is shorter than a second length of the boundary between the upper chamber and the lower chamber in the longitudinal direction of the vehicle; and
   the deployment direction restrictor is arranged in the side airbag such that a first gas passage and a second gas passage through which the upper chamber and the lower chamber communicate with each other are formed on a vehicle front side and a vehicle rear side of the deployment direction restrictor, respectively.

5. The vehicle side airbag apparatus according to claim 4, wherein:
   the upper chamber protrudes toward the front side of the vehicle more than the lower chamber does; and
   a first cross-sectional area of the first gas passage is larger than a second cross-sectional area of the second gas passage.

6. The vehicle side airbag apparatus according to claim 1, wherein:
   a first length of the deployment direction restrictor in a longitudinal direction of the vehicle is substantially equal to a second length of a boundary between the upper chamber and the lower chamber in the longitudinal direction of the vehicle; and an opening through which the upper chamber and the lower chamber communicate with each other is formed at a center of the deployment direction restrictor.

7. The vehicle side airbag apparatus according to claim 1, wherein the gas generator is provided in the side portion.

8. The vehicle side airbag apparatus according to claim 7, wherein the gas generator is provided in the side portion such that a lengthwise direction of the gas generator coincides with a height direction of the seatback.

9. The vehicle side airbag apparatus according to claim 8, wherein the gas generator includes an inflation gas outlet provided at the upper end of the gas generator.

10. The vehicle side airbag apparatus according to claim 1, wherein the side airbag is formed, substantially, in the shape of the letter "Z" when viewed in the lateral direction of the vehicle.

11. The vehicle side airbag apparatus according to claim 1, wherein the side airbag is formed by holding an airbag base cloth having a substantially V shape at a middle portion in a lateral direction of the airbag base cloth, and sewing an outer periphery of the held airbag base cloth.

12. The vehicle side airbag apparatus according to claim 1, wherein the side airbag is formed by holding an airbag base cloth having a substantially curly bracket or brace shape at middle portion in an up-down direction of the airbag base cloth, and sewing an outer periphery of the held airbag base cloth.

13. The vehicle side airbag apparatus according to claim 1, wherein the deployment direction restrictor is a strap that is made of fabric, and that has a rectangular shape in a plan view.

* * * * *

UNITED STATES PATENT AND TRADEMARK OFFICE
CERTIFICATE OF CORRECTION

PATENT NO.        : 7,559,573 B2                                                Page 1 of 1
APPLICATION NO.   : 11/976692
DATED             : July 14, 2009
INVENTOR(S)       : Osamu Fukawatase et al.

It is certified that error appears in the above-identified patent and that said Letters Patent is hereby corrected as shown below:

In claim 1, column 8, line 5, following "glass;" insert a paragraph break and --a seat adjacent the vehicle door;--.

Signed and Sealed this

Thirteenth Day of October, 2009

David J. Kappos
*Director of the United States Patent and Trademark Office*